United States Patent
Kumar

(10) Patent No.: US 11,515,913 B2
(45) Date of Patent: Nov. 29, 2022

(54) SOUNDING REFERENCE SIGNAL ANTENNA SWITCHING IN A DUAL CONNECTIVITY MODE

(71) Applicant: QUALCOMM Incorporated, San Diego, CA (US)

(72) Inventor: Akash Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 17/074,111

(22) Filed: Oct. 19, 2020

(65) Prior Publication Data

US 2021/0384949 A1 Dec. 9, 2021

(30) Foreign Application Priority Data

Jun. 8, 2020 (IN) .............................. 202041023967

(51) Int. Cl.
*H04W 4/00* (2018.01)
*H04B 7/06* (2006.01)
(Continued)

(52) U.S. Cl.
CPC ......... *H04B 7/0608* (2013.01); *H04L 5/0048* (2013.01); *H04W 76/15* (2018.02); *H04W 88/06* (2013.01)

(58) Field of Classification Search
None
See application file for complete search history.

(56) References Cited

U.S. PATENT DOCUMENTS

| 2015/0056933 A1* | 2/2015 | Yan | H04B 1/44 455/78 |
|---|---|---|---|
| 2020/0068647 A1* | 2/2020 | Jha | H04W 60/005 |
| 2021/0068060 A1* | 3/2021 | Nilsson | H04W 52/325 |

FOREIGN PATENT DOCUMENTS

WO    WO-2020084362 A1    4/2020

OTHER PUBLICATIONS

Huawei, et al., "Introduction of Additional SRS Symbols in Normal UL Subframe", 3GPP Draft, R1-1906069, 3GPP TSG RAN WG1 Meeting #97, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 4, 2019 (May 4, 2019), XP051708111, 7 Pages, Retrieved from the Internet: URL: http://www.3gpp.org/ftp/tsg%5Fran/WG1%5FRL1/TSGR1%5F97/Docs/R1%2D1906069%2Ezip, [retrieved on May 4, 2019], Section 2.4 "Details of Repetition, Frequency Hopping and Antenna Switching for Additional SRS Symbols" pp. 4-6, Figures 3, 4, The whole document.

(Continued)

*Primary Examiner* — Zewdu A Beyen
(74) *Attorney, Agent, or Firm* — Harrity & Harrity, LLP

(57) ABSTRACT

Various aspects of the present disclosure generally relate to wireless communication. In some aspects, a user equipment may determine a collision between one or more sounding reference signal (SRS) resources to be used for an SRS antenna switching procedure for a first radio access technology (RAT) and a signal of a second RAT based at least in part on a time domain overlap of transmissions of the one or more SRS resources and an active time of the signal of the second RAT, and modify a configuration of the SRS antenna switching procedure to mitigate the collision, wherein the modified configuration indicates that the one or more SRS resources are configured to be transmitted using antenna elements of the UE that are different than antenna elements (Continued)

of the UE to be used for receiving the signal of the second RAT. Numerous other aspects are provided.

30 Claims, 8 Drawing Sheets

(51) Int. Cl.
*H04W 76/15* (2018.01)
*H04L 5/00* (2006.01)
*H04W 88/06* (2009.01)

(56) References Cited

OTHER PUBLICATIONS

International Search Report and Written Opinion—PCT/US2021/034033—ISA/EPO—dated Aug. 18, 2021.

\* cited by examiner

SOUNDING REFERENCE SIGNAL ANTENNA SWITCHING IN A DUAL CONNECTIVITY MODE

CROSS-REFERENCE TO RELATED APPLICATION

This Patent Application claims priority to Indian Provisional Patent Application No. 202041023967, filed on Jun. 8, 2020, entitled "SOUNDING REFERENCE SIGNAL ANTENNA SWITCHING IN A DUAL CONNECTIVITY MODE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sounding reference signal (SRS) antenna switching in a dual connectivity mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include determining a collision between one or more sounding reference signal (SRS) resources to be used for an SRS antenna switching procedure for a first radio access technology (RAT) and a signal of a second RAT based at least in part on a time domain overlap of transmissions of the one or more SRS resources and an active time of the signal of the second RAT; and modifying a configuration of the SRS antenna switching procedure to mitigate the collision, wherein the modified configuration indicates that the one or more SRS resources are configured to be transmitted using one or more antenna elements of the UE that are different than one or more antenna elements of the UE to be used for receiving the signal of the second RAT.

In some aspects, a UE for wireless communication may include a memory and one or more processors operatively coupled to the memory. The memory and the one or more processors may be configured to determine a collision between one or more SRS resources to be used for an SRS antenna switching procedure for a first RAT and a signal of a second RAT based at least in part on a time domain overlap of transmissions of the one or more SRS resources and an active time of the signal of the second RAT; and modify a configuration of the SRS antenna switching procedure to mitigate the collision, wherein the modified configuration indicates that the one or more SRS resources are configured to be transmitted using one or more antenna elements of the UE that are different than one or more antenna elements of the UE to be used for receiving the signal of the second RAT.

In some aspects, a non-transitory computer-readable medium may store one or more instructions for wireless communication. The one or more instructions, when executed by one or more processors of a UE, may cause the one or more processors to determine a collision between one or more SRS resources to be used for an SRS antenna switching procedure for a first RAT and a signal of a second RAT based at least in part on a time domain overlap of transmissions of the one or more SRS resources and an active time of the signal of the second RAT; and modify a configuration of the SRS antenna switching procedure to mitigate the collision, wherein the modified configuration indicates that the one or more SRS resources are configured to be transmitted using one or more antenna elements of the UE that are different than one or more antenna elements of the UE to be used for receiving the signal of the second RAT.

In some aspects, an apparatus for wireless communication may include means for determining a collision between one or more SRS resources to be used for an SRS antenna switching procedure for a first RAT and a signal of a second RAT based at least in part on a time domain overlap of transmissions of the one or more SRS resources and an active time of the signal of the second RAT; and means for modifying a configuration of the SRS antenna switching procedure to mitigate the collision, wherein the modified configuration indicates that the one or more SRS resources are configured to be transmitted using one or more antenna elements of the apparatus that are different than one or more antenna elements of the apparatus to be used for receiving the signal of the second RAT.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
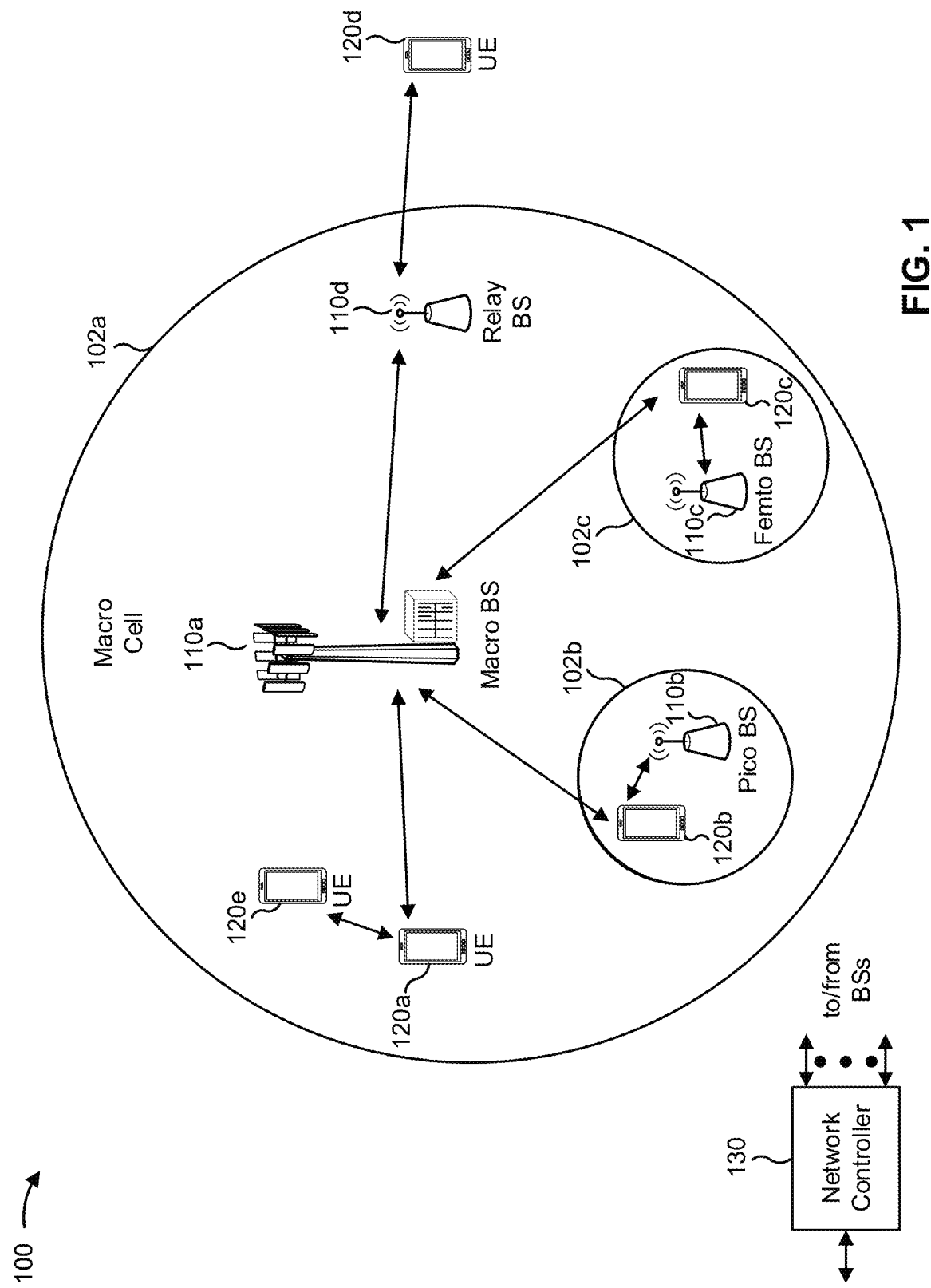
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
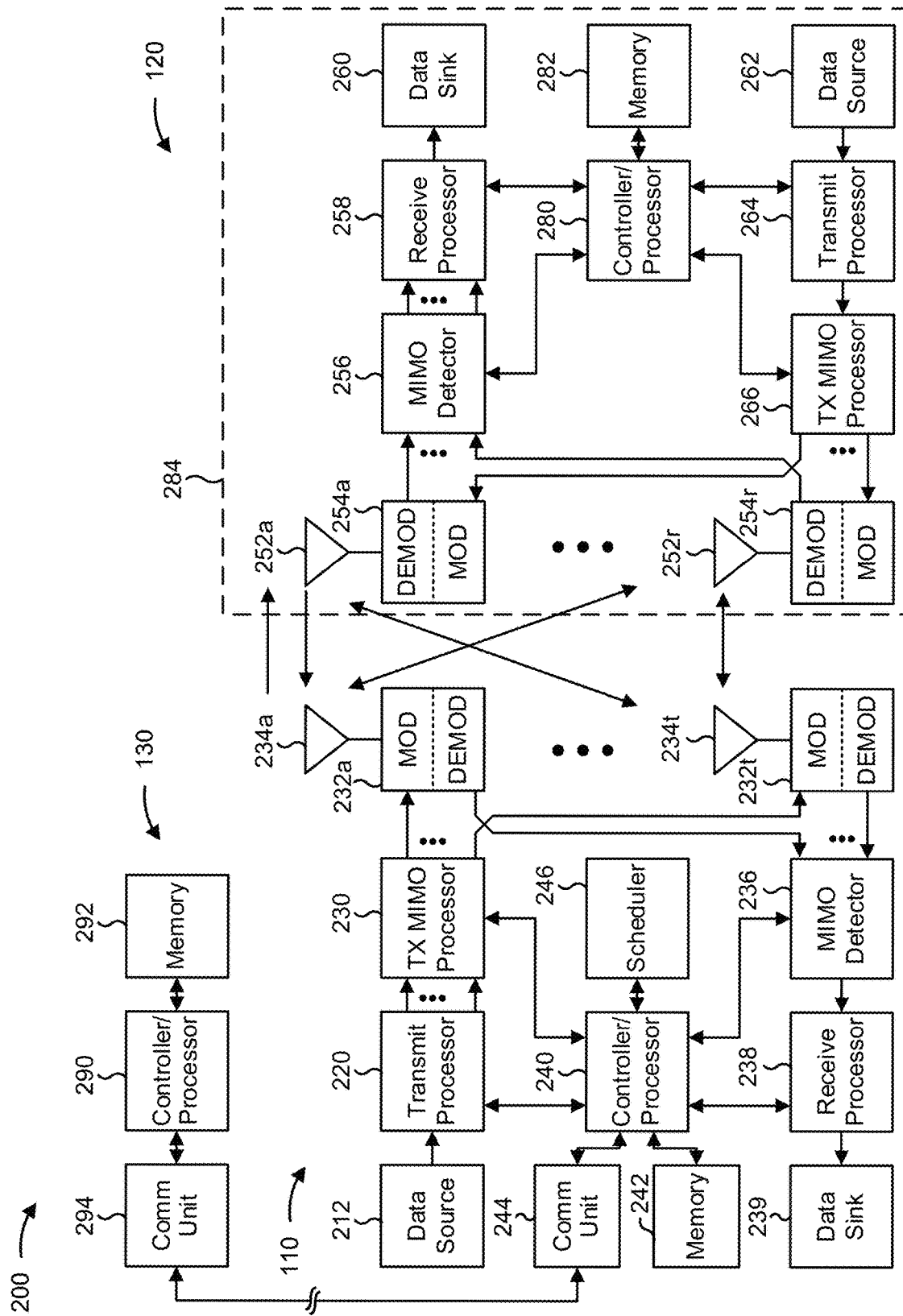
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7 and 8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate with network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7 and 8.

Controller/processor 240 of base station 110, controller/processor 280 of UE 120, and/or any other component(s) of FIG. 2 may perform one or more techniques associated with sounding reference signal (SRS) antenna switching in a dual connectivity mode, as described in more detail elsewhere herein. For example, controller/processor 240 of base station 110, controller/processor 280 of UE 120, and/or any other component(s) of FIG. 2 may perform or direct operations of, for example, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 800 of FIG. 8, and/or other processes as described herein. In some aspects, executing instructions may include running the instructions, converting the instructions, compiling the instructions, interpreting the instructions, and/or the like.

In some aspects, UE 120 may include means for determining a collision between one or more SRS resources to be used for an SRS antenna switching procedure for a first radio access technology (RAT) and a signal of a second RAT based at least in part on a time domain overlap of transmissions of the one or more SRS resources and an active time of the signal of the second RAT, means for modifying a configuration of the SRS antenna switching procedure to mitigate the collision, wherein the modified configuration indicates that the one or more SRS resources are configured to be transmitted using one or more antenna elements of the UE that are different than one or more antenna elements of the UE to be used for receiving the signal of the second RAT, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided as an example. Other examples may differ from what is described with regard to FIG. 2.

Figure 3:
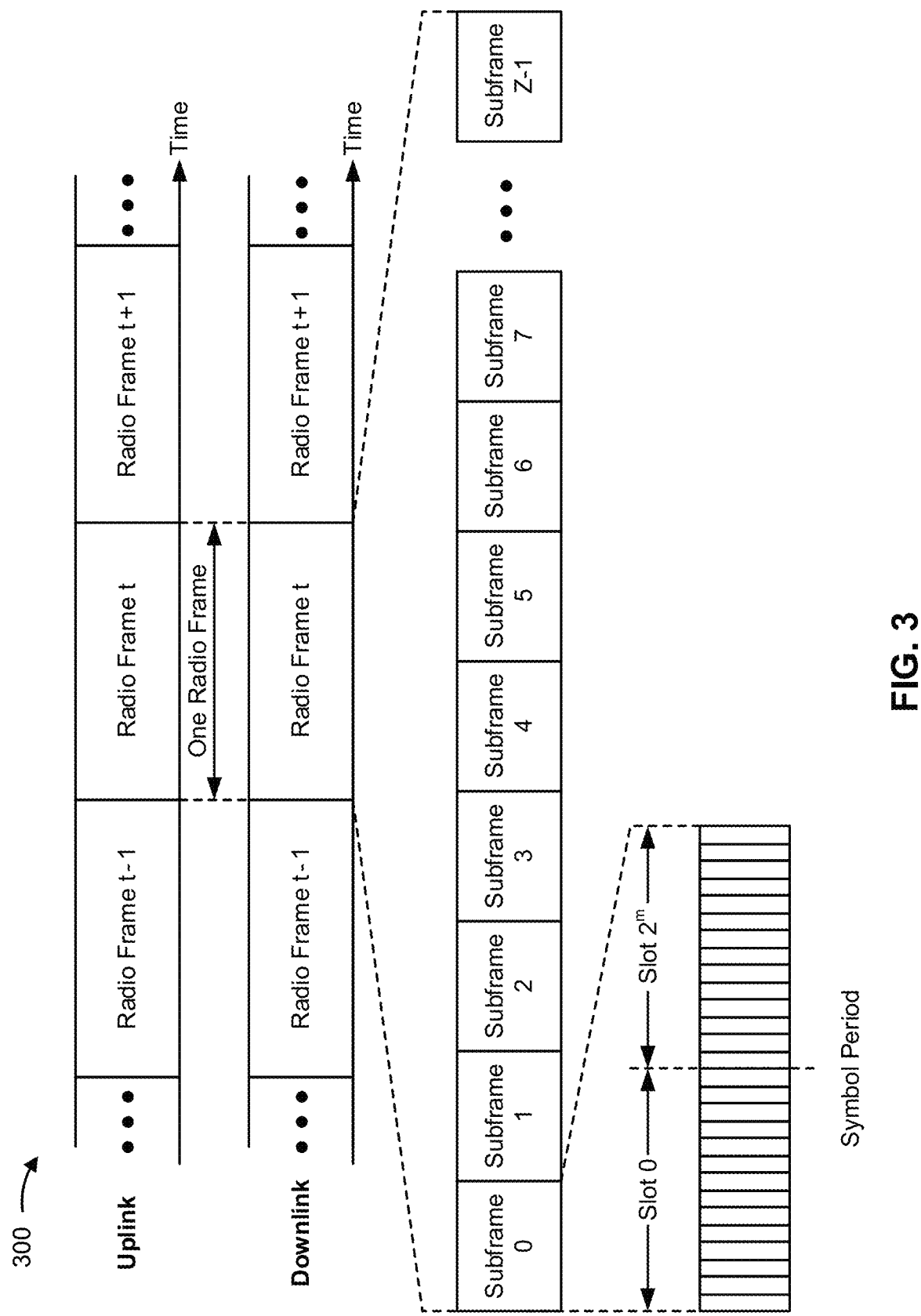
FIG. 3 is a diagram illustrating an example of a frame structure in a wireless communication network, in accordance with various aspects of the present disclosure.

FIG. 3 is a diagram illustrating an example 300 of a frame structure in a wireless communication network, in accordance with various aspects of the present disclosure. The frame structure shown in FIG. 3 is for frequency division duplexing (FDD) in a telecommunication system, such as LTE, NR, and/or the like. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2m slots per subframe are shown in FIG. 3, where m is an index of a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, symbol-based, and/or the like.

As indicated above, FIG. 3 is provided as an example. Other examples may differ from what is described with respect to FIG. 3.

Figure 4:
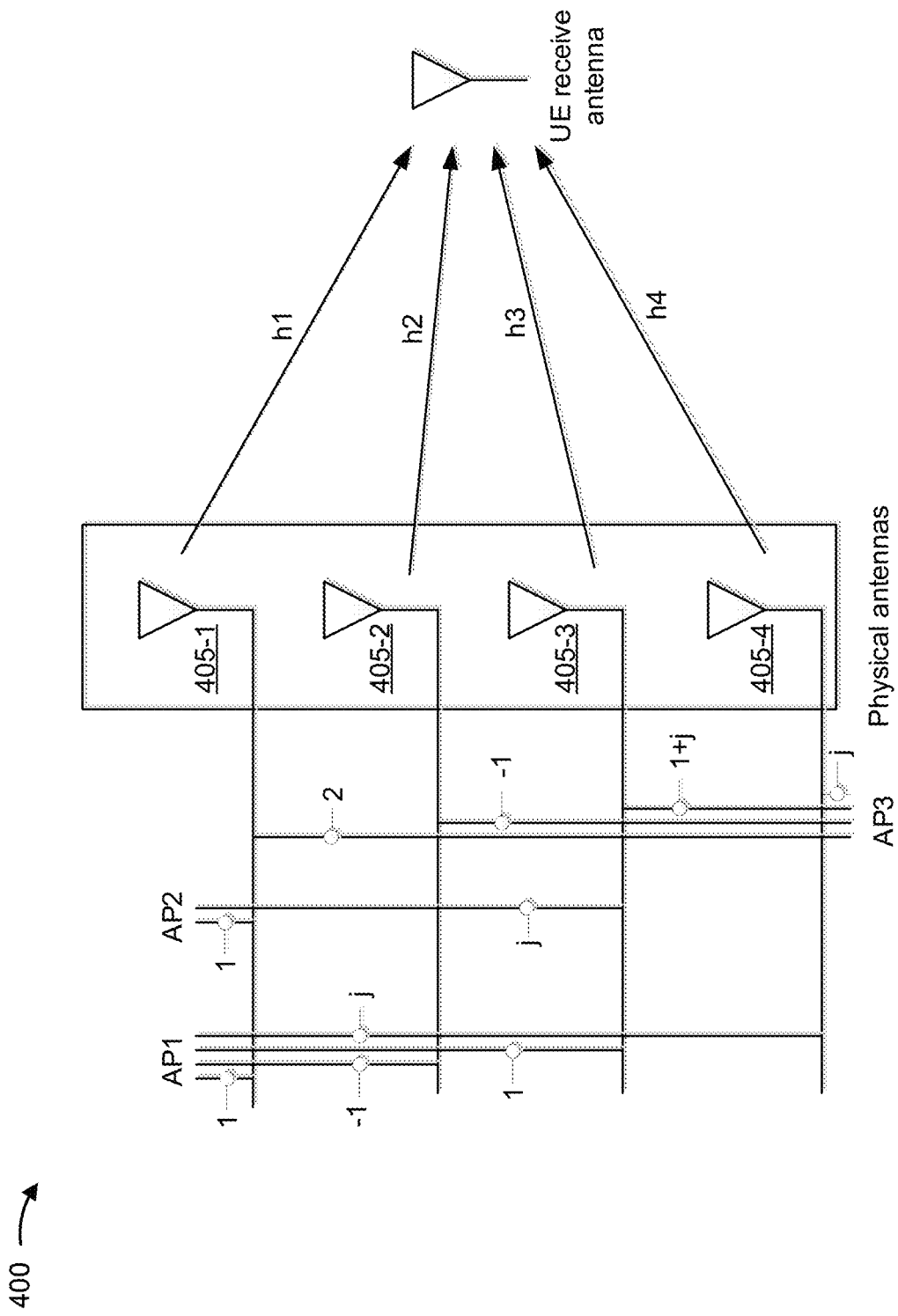
FIG. 4 is a diagram illustrating an example of antenna ports, in accordance with various aspects of the present disclosure.

FIG. 4 is a diagram illustrating an example 400 of antenna ports, in accordance with various aspects of the present disclosure.

As shown in FIG. 4, a first physical antenna 405-1 may transmit information via a first channel h1, a second physical antenna 405-2 may transmit information via a second channel h2, a third physical antenna 405-3 may transmit information via a third channel h3, and a fourth physical antenna 405-4 may transmit information via a fourth channel h4. Such information may be conveyed via a logical antenna port, which may represent some combination of the physical antennas and/or channels. In some cases, a UE 120 may not have knowledge of the channels associated with the physical antennas, and may only operate based on knowledge of the channels associated with antenna ports, as defined below.

An antenna port may be defined such that a channel over which a symbol on the antenna port is conveyed can be inferred from a channel over which another symbol on the same antenna port is conveyed. In example 400, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and a specific set of weighting factors applied to a set of channels may be referred as a precoder.

Similarly, a channel associated with antenna port 2 (AP2) is represented as h1+j*h3, and a channel associated with antenna port 3 (AP3) is represented as 2*h1−h2+(1+j)*h3+j*h4. In this case, antenna port 3 can be represented as the sum of antenna port 1 and antenna port 2 (e.g., AP3=AP1+AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

As indicated above, FIG. 4 is provided merely as an example. Other examples may differ from what is described with regard to FIG. 4.

Figure 5:
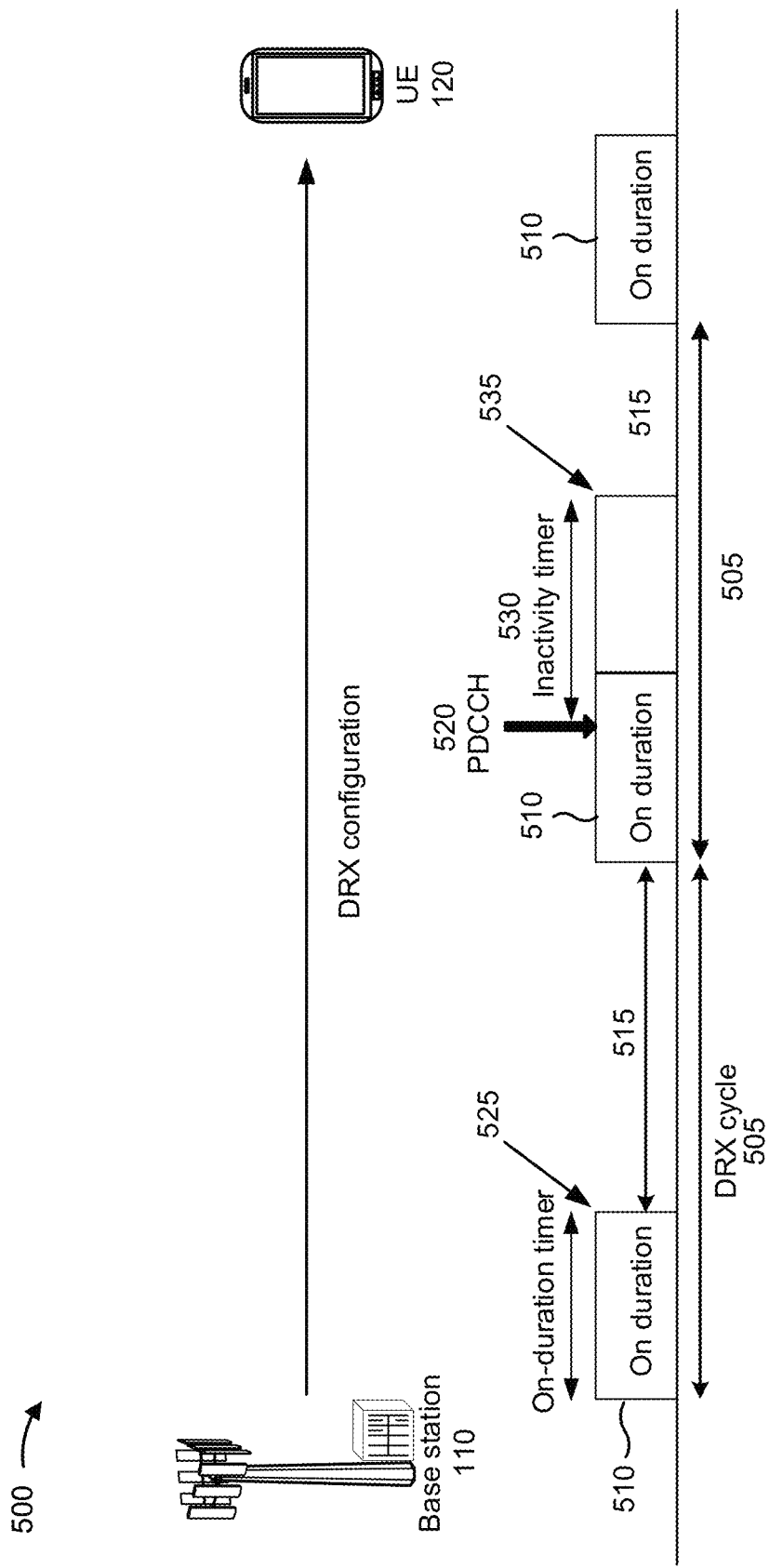
FIG. 5 is a diagram illustrating an example of a discontinuous reception (DRX) configuration, in accordance with various aspects of the present disclosure.

FIG. 5 is a diagram illustrating an example 500 of a discontinuous reception (DRX) configuration, in accordance with various aspects of the present disclosure.

As shown in FIG. 5, a base station 110 may transmit a DRX configuration to a UE 120 to configure a DRX cycle 505 for the UE 120. A DRX cycle 505 may include a DRX on duration 510 (e.g., during which a UE 120 is awake or in an active state) and an opportunity to enter a DRX sleep state 515. As used herein, the time during which the UE 120 is configured to be in an active state during the DRX on duration 510 may be referred to as an active time, and the time during which the UE 120 is configured to be in the DRX sleep state 515 may be referred to as an inactive time. As described below, the UE 120 may monitor a physical downlink control channel (PDCCH) during the active time, and may refrain from monitoring the PDCCH during the inactive time.

During the DRX on duration 510 (e.g., the active time), the UE 120 may monitor a downlink control channel (e.g., a PDCCH), as shown by reference number 520. For example, the UE 120 may monitor the PDCCH for downlink control information (DCI) pertaining to the UE 120. If the UE 120 does not detect and/or successfully decode any PDCCH communications intended for the UE 120 during the DRX on duration 510, then the UE 120 may enter the sleep state 515 (e.g., for the inactive time) at the end of the DRX on duration 510, as shown by reference number 525. In this way, the UE 120 may conserve battery power and reduce power consumption. As shown, the DRX cycle 505 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 530 (e.g., which may extend the active time). The UE 120 may start the DRX inactivity timer 530 at a time at which the PDCCH communication is received (e.g., in a transmission time interval (TTI) in which the PDCCH communication is received, such as a slot, a subframe, and/or the like). The UE 120 may remain in the active state until the DRX inactivity timer 530 expires, at which time the UE 120 may enter the sleep state 515 (e.g., for the inactive time), as shown by reference number 535. During the duration of the DRX inactivity timer 530, the UE 120 may continue to monitor for PDCCH communications, may obtain a downlink data communication (e.g., on a downlink data channel, such as a physical downlink shared channel (PDSCH)) scheduled by the PDCCH communication, may prepare and/or transmit an uplink communication (e.g., on a physical uplink shared channel (PUSCH)) scheduled by the PDCCH communication, and/or the like. The UE 120 may restart the DRX inactivity timer 530 after each detection of a PDCCH communication for the UE 120 for an initial transmission (e.g., but not for a retransmission). By operating in this manner, the UE 120 may conserve battery power and reduce power consumption by entering the sleep state 515.

As indicated above, FIG. 5 is provided as an example. Other examples may differ from what is described with respect to FIG. 5.

Figure 6:
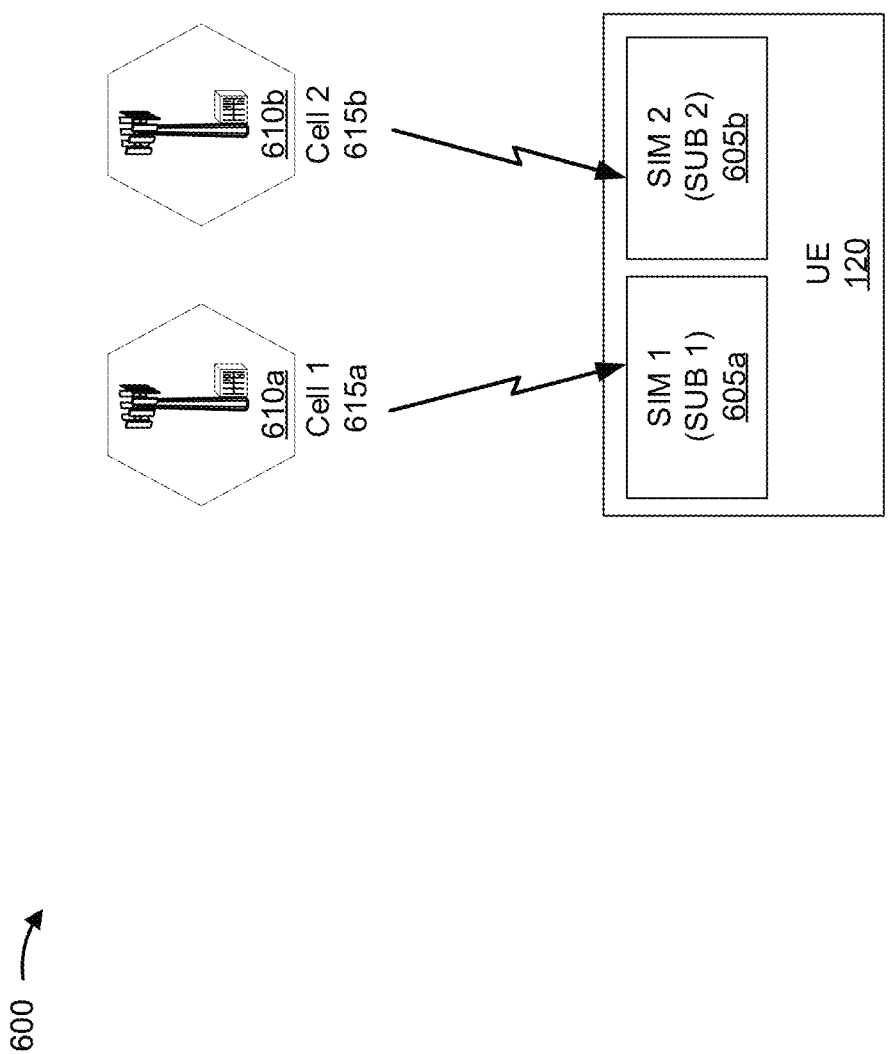
FIG. 6 is a diagram illustrating an example of a multi-subscriber identity module (multi-SIM) UE, in accordance with various aspects of the present disclosure.

FIG. 6 is a diagram illustrating an example 600 of a multiple subscriber identity module (multi-SIM) UE, in accordance with various aspects of the present disclosure. As shown in FIG. 6, a UE 120 may be a multi-SIM UE that includes multiple SIMs (two or more SIMs), shown as a first SIM 605a and a second SIM 605b. The first SIM 605a may be associated with a first subscription (shown as SUB 1), and the second SIM 605b may be associated with a second subscription (shown as SUB 2). A subscription may include a subscription with a network operator (for example, a mobile network operator (MNO)) that enables the UE 120 to access a wireless network (for example, a radio access network (RAN)) associated with the network operator.

A SIM 605 may be a removable SIM (for example, a SIM card) or an embedded SIM. A SIM 605 may include an integrated circuit that securely stores an international mobile subscriber identity (IMSI) and a security key, which are used to identify and authenticate a corresponding subscription associated with the SIM 605. In some cases, a SIM 605 may store a list of services that the UE 120 has permission to access using a subscription associated with the SIM 605, such as a data service or a voice service, among other examples.

As further shown in FIG. 6, the UE 120 may communicate (for example, in a connected mode, an idle mode, or an inactive mode) with a first base station 610a via a first cell 615a (shown as Cell 1) using the first SIM 605a. In this case, a first subscription (SUB 1) of the UE 120 may be used to access the first cell 615a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 610b via a second cell 615b (shown as Cell 2) using the second SIM 605b. In this case, a second subscription (SUB 2) of the UE 120 may be used to access the second cell 615b (for example, using a second IMSI for UE identification, using a second security key for UE authentication, using a second list of services that the UE 120 is permitted to access using the second subscription, or by counting data or voice usage on the second cell against the second subscription, among other examples).

The first base station 610a and/or the second base station 610b may include one or more of the base stations 110 described above in connection with FIG. 1. Although the first cell 615a and the second cell 615b are shown as being provided by different base stations, in some aspects, the first cell 615 and the second cell 615b may be provided by the same base station. Thus, in some aspects, the first base station 610a and the second base station 610b may be integrated into a single base station.

In some cases, the UE 120 may be a single receiver (SR) (sometimes also referred to as single radio) multi-SIM UE, such as an SR multi-SIM multiple standby (SR-MSMS) UE or a single receiver dual SIM dual standby (SR-DSDS) UE, among other examples. A multi-SIM UE may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, an SR-DSDS UE or an SR-MSMS UE may only be capable of receiving data on one connection at a time because radio frequency resources are shared between the multiple subscriptions. For example, an SR-DSDS UE or an SR-MSMS UE may be associated with multiple subscriptions but may include only a single transceiver shared by the multiple subscriptions, a single transmit chain shared by the multiple subscriptions, or a single receive chain shared by the multiple subscriptions, among other examples.

In some cases, a first subscription of a multi-SIM UE may be communicating with a first cell using a first RAT (e.g., a NR RAT and/or the like) and a second subscription of the multi-SIM UE may be communicating with a second cell using a second RAT (e.g., LTE RAT and/or the like). The multi-SIM UE may be operating in a standalone (SA) mode or a non-standalone (NSA) mode. For example, the multi-SIM UE may be an operating in an Evolved-UMTS Terrestrial Radio Access Network (E-UTRAN) NRDC (ENDC) mode.

In some cases, the multi-SIM UE may support a sounding reference signal (SRS) switching capability for transmitting SRSs to the first cell (e.g., to indicate downlink channel state information (CSI) with reciprocity between an uplink and downlink channel). The SRS switching capability may indicate a quantity of antenna elements (e.g., antenna ports, antennas, antenna modules, and/or the like) associated with an SRS antenna switching procedure (e.g., a quantity of antennas on which the multi-SIM UE is to transmit the SRS during the SRS antenna switching procedure and/or the like). The multi-SIM UE may receive signals from the second cell using shared antenna elements (e.g., using antenna elements shared with the SRS antenna switching procedure). However, where the multi-SIM UE is to transmit an SRS using one or more antenna elements at the same time as the multi-SIM UE is to receive/decode a signal from the second cell using the same one or more antenna elements, the multi-SIM UE must drop the SRS (e.g., not transmit the SRS) so as to not damage the one or more antenna elements and/or cause issues with receiving/decoding the signal from the second cell. This may cause the first cell to determine that the one or more antenna elements associated with the dropped SRS are associated with poor channel conditions (e.g., based at least in part on the SRS antenna switching procedure). Moreover, as both the SRS antenna switching procedure and the signal from the second cell may be periodic, the multi-SIM UE may periodically (e.g., continually) drop an SRS to be transmitted using certain antenna elements. As a result, the first cell may not schedule transmissions using the one or more antenna elements, may reduce a number of downlink MIMO layers, and/or the like even if the one or more antenna elements are not actually associated with poor channel conditions. This may negatively impact performance of communications between the multi-SIM UE and the first cell, a key performance indicator (KPI) between the multi-SIM UE and the first cell, and/or the like.

Some techniques and apparatuses described herein enable a UE to perform SRS antenna switching in a dual connectivity mode (e.g., a multi-SIM mode, an NSA mode, and/or the like) by enabling the UE to map SRS resources for the SRS antenna switching procedure (e.g., for a first RAT, such as NR and/or the like) to antenna elements that do not collide with a signal for a second RAT (e.g., LTE RAT and/or the like). For example, the UE may determine a collision based at least in part on determining that an SRS resource to be used for SRS antenna switching is to be transmitted at a same time as the UE is to receive and/or decode a signal for the second RAT. The UE may be enabled to map the SRS resource(s) that collide with the signal of the second RAT to antenna elements that are not common with the one or more antenna elements to be used for receiving and/or decoding a transmission for the second RAT. As a result, the UE may perform the SRS antenna switching procedure using all antenna elements associated with the SRS antenna switching procedure (e.g., without dropping an SRS transmission) while also not impacting the reception/decoding of the signal of the second RAT. This conserves resources that would have otherwise been used dropping an SRS resource that collides with the signal of the second RAT. Moreover, this improves performance of communications between the UE and the first cell, as the first cell may be enabled to accurately determine channel conditions for each antenna port of the UE (e.g., as the UE does not need to drop one or more SRSs due to the collision with the signal of the second RAT).

As indicated above, FIG. 6 is provided as an example. Other examples may differ from what is described with regard to FIG. 6.

Figure 7:
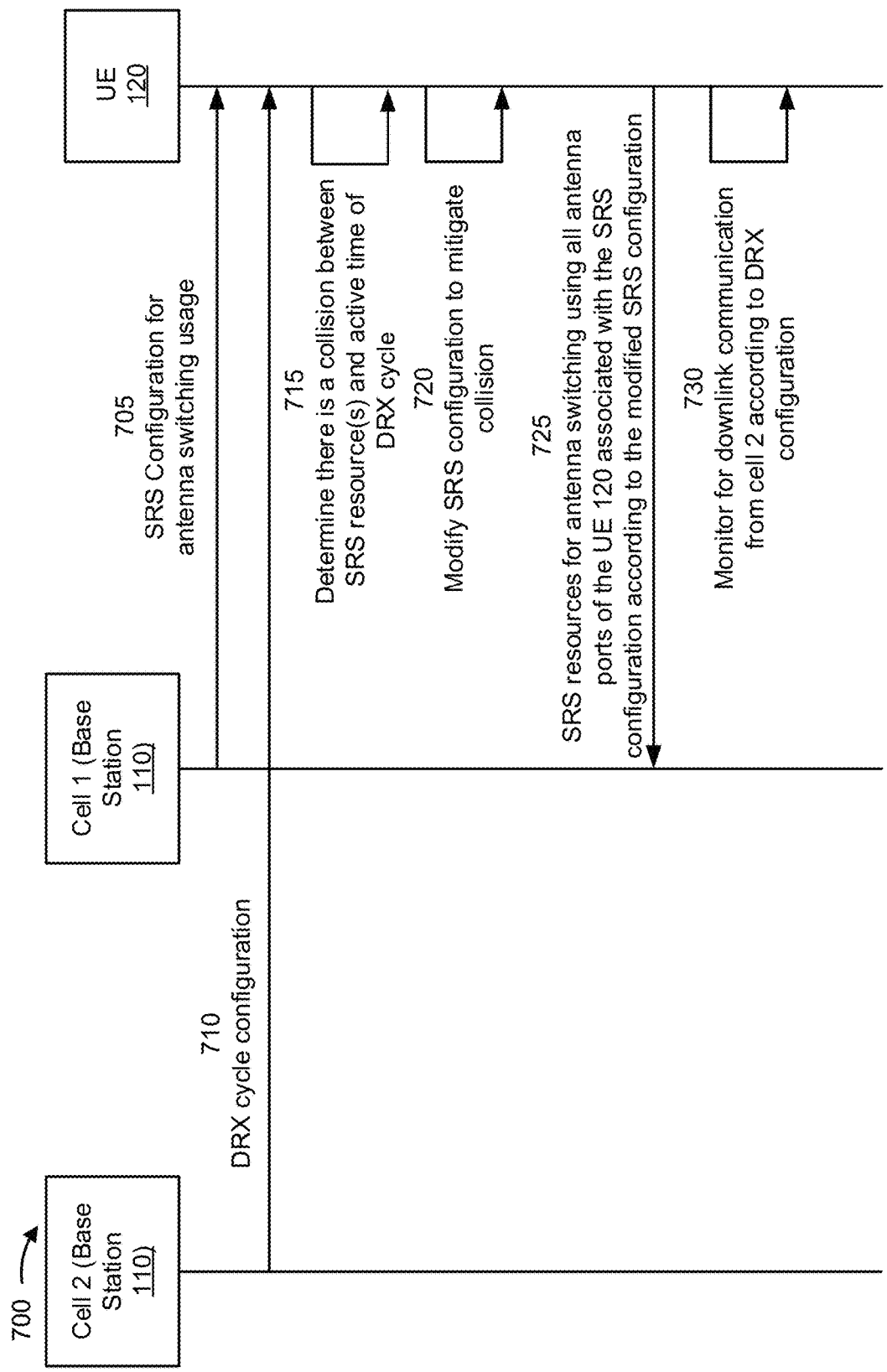
FIG. 7 is a diagram illustrating an example associated with sounding reference signal (SRS) antenna switching in a dual connectivity mode, in accordance with various aspects of the present disclosure.

FIG. 7 is a diagram illustrating an example 700 associated with SRS antenna switching in a dual connectivity mode, in accordance with various aspects of the present disclosure. As shown in FIG. 7, a UE 120 may communicate with a first cell (e.g., with a first base station 110) and a second cell (e.g., with a second base station 110).

The UE 120 may be a multi-SIM UE 120 (e.g., may be operating in a multi-SIM mode). For example, a first SIM of the UE 120 may be communicating with a first cell (e.g., with a first base station 110) using a first radio access technology (RAT) (e.g., an NR RAT and/or the like). A second SIM of the UE 120 may be communicating with a second cell (e.g., with a second base station 110) using a second RAT (e.g., an LTE RAT and/or the like). In some aspects, the first SIM may be communicating with the first cell in a connected mode (e.g., a radio resource control (RRC) connected mode and/or the like). The second SIM may be communicating with the second cell in an idle mode. In some aspects, the UE 120 may use shared antenna elements (e.g., antennas, antenna ports, antenna modules, antenna switches, and/or the like) to communicate with the first cell and the second cell.

As shown by reference number 705, the UE 120 may receive an SRS configuration from the first cell. The SRS configuration may be an SRS resource set configuration. In some aspects, the first cell may transmit an indication of the SRS resource set configuration to UE 120 in a signaling communication, such as an RRC communication, a medium access control (MAC) control element (MAC-CE) communication, a downlink control information (DCI) communication, or the like.

The SRS resource set configuration may indicate a configuration for one or more SRS resource sets that UE 120 may use to transmit an SRS to the first cell. An SRS resource set may include one or more SRS resources, which may each include time resources or frequency resources (for example, a slot, a symbol, a resource block, a periodicity for the time resources, and/or the like). The SRS resource set configuration may map an SRS resource to one or more antenna ports of UE 120 (such as Antenna Port 1, Antenna Port 2, and so on). Thus, the SRS resource set configuration may indicate one or more time-frequency resources in which an SRS is to be transmitted, and may indicate one or more antenna ports on which the SRS is to be transmitted in those time-frequency resources.

Moreover, in some aspects, the SRS resource set configuration may indicate a use case (for example, in an SRS-SetUse information element) for the SRS resource set. For example, an SRS resource set may have a use case for antenna switching, codebook, non-codebook, beam management, or the like.

An antenna switching SRS resource set may be used to indicate downlink channel state information (CSI) with reciprocity between an uplink and downlink channel. For example, when there is reciprocity between an uplink channel and a downlink channel, a base station 110 (e.g., of the first cell) may use an antenna switching SRS (for example, an SRS transmitted using a resource of an antenna switching SRS resource set) to acquire downlink CSI (for example, to determine a downlink precoder to be used to communicate with the UE 120). For example, in a time division duplex (TDD) multiple input multiple output (MIMO) communication system, an SRS may be used for reciprocity-based beamforming. For example, the UE 120 may transmit an SRS in an uplink channel, and a base station 110 may receive the SRS. The base station 110 may use the SRS to estimate channel conditions of the uplink channel and may perform beamforming and/or precoding for a corresponding downlink channel using the estimated channel conditions of the uplink channel.

In some aspects, the UE 120 may have more receive (Rx) resources than transmit (Tx) resources. For example, the UE 120 may have more Rx antennas (e.g., four and/or the like) than Tx chains (e.g., two and/or the like), so the UE 120 may be limited to transmitting uplink communications on one of the antennas. Additionally, or alternatively, the UE 120 may support more bands/carriers for downlink carrier aggregation (e.g., three and/or the like) than Tx chains (e.g., one and/or the like) of the UE 120, so the UE 120 may be limited to transmitting uplink communications in one of the bands. The asymmetry between Rx, or downlink resources, and Tx, or uplink resources, may limit reciprocity-based beamforming since the base station 110 cannot estimate all of the channels because the UE 120 can only transmit on some antennas and/or bands. To assist with reciprocity-based beamforming, the UE 120 may be capable of switching Tx resources among different antennas and/or bands (e.g., carriers). For example, antenna switching may permit the UE 120 to transmit SRS from multiple antennas when the UE 120 has more Rx antennas than Tx chains.

The SRS configuration for an antenna switching usage may be based at least in part on a reported SRS antenna switching capability of the UE 120. In some aspects, the UE 120 may report an SRS antenna switching capability where a number of Tx chains of the UE 120 is not equal to the number of Rx chains of the UE 120. As a result, the UE 120 may need to perform antenna switching (e.g., between Tx chains, Tx antennas, Tx antenna ports, and/or the like) to transmit SRS for downlink channel estimation corresponding to all of the Rx chains (e.g., because there are fewer Tx chains than Rx chains in the UE 120).

Additionally, or alternatively, the antenna switching capability may indicate a number of Tx antennas and Rx antennas, of the UE 120, that the UE 120 is capable of switching. For example, the antenna switching capability may indicate that the UE 120 is capable of switching between 1 Tx antenna and 2 Rx antennas (1T2R), between 1 Tx antenna and 4 Rx antennas (1T4R), between 2 Tx antenna and 4 Rx antennas (2T4R), between 4 Tx antenna and 4 Rx antennas (4T4R), between an equal number of Tx antennas and Rx antennas (T=R), and/or the like. For example, for a 2T4R UE with 2 Tx chains and 4 Rx chains, the UE 120 may transmit an SRS twice on each of the 2 Tx chains (e.g., using antenna switching) to sound the channels for each of the 4 Rx chains. Similarly, for a 1T4R UE with 1 Tx chain and 4 Rx chains, the UE 120 may transmit SRS four times on the single Tx chain (e.g., using antenna switching) to sound the channels for each of the 4 Rx chains (e.g., transmit an SRS resource using four different antennas of the UE 120).

For example, for an SRS antenna switching capability of 1T4R, the SRS configuration may indicate an SRS resource set configuration. The resource set may include 4 SRS resources. The SRS configuration may indicate that the UE 120 is to transmit, using the single Tx chain, one SRS resource on each of the 4 Rx antennas of the UE 120 (e.g., using antenna switching). An SRS resource may indicate a periodicity associated with the SRS resource (e.g., indicating how often the SRS resource is to be transmitted, such as every M slots and/or symbols, where M is an integer greater than 0). An SRS resource may indicate an offset associated with the SRS resource (e.g., a slot offset associated with the SRS resource indicating which slot the SRS is to be transmitted during). An SRS resource may indicate a starting symbol and a duration (e.g., indicating which symbol the SRS resource is to start in a slot and a quantity of symbols associated with the SRS resource). The slot and/or symbols associated with the SRS resources may be associated with a frame structure of the first RAT (e.g., may be based at least in part on an NR frame structure and/or the like).

In some aspects, the SRS configuration may indicate which Rx antenna is to be used to transmit an SRS resource included in the SRS resource set. In some aspects, the UE 120 may map SRS resources to Rx antennas sequentially (e.g., a first SRS resource to a first Rx antenna, a second SRS resource to a second Rx antenna, and so on) to perform the SRS antenna switching procedure.

As shown by reference number 710, the UE 120 may receive, from the second cell (e.g., the LTE cell), a DRX cycle configuration. The DRX cycle configuration may indicate an on duration (e.g., an active time) during which the UE 120 may monitor a physical downlink control channel (PDCCH) for a downlink signal associated with the second cell. The DRX cycle configuration may indicate a sleep state or an inactive time during which the UE 120 may not monitor the PDCCH and/or during which the UE 120 may be in a reduced power mode (e.g., for the second subscription associated with the second cell). The DRX cycle (e.g., the active state and the inactive state) may repeat with a configured periodicity according to the DRX configuration. For example, the DRX configuration may indicate a starting symbol and a duration for the active state of the DRX cycle. The DRX cycle may indicate a periodicity associated with the DRX cycle (e.g., indicating a number of slots and/or symbols between each active state of the DRX cycle, and/or the like). The slot and/or symbols associated with the DRX cycle may be associated with a frame structure of the second RAT (e.g., may be based at least in part on an LTE frame structure and/or the like).

As shown by reference number 715, the UE 120 may determine that there is a collision between one or more SRS resources to be used for an SRS antenna switching procedure and the signal of the second RAT (e.g., associated with the active time of the DRX cycle) based at least in part on a time domain overlap of transmissions of the one or more SRS resources and an active time of the signal of the second RAT. The UE 120 may compare the frame structure of the first RAT to the frame structure of the second RAT. The UE may determine a frame timing between the frame structure of the first RAT and the frame structure of the second RAT to determine one or more slots of the first RAT that are associated with the active time of the signal of the second RAT. For example, the UE 120 may determine slots and/or symbols of the second RAT that are associated with the active time of the signal of the second RAT (e.g., with the active time of the DRX cycle of the second RAT). In some aspects, the UE 120 may determine, based at least in part on the DRX cycle, one or more subframes of the second RAT associated with the active time of the signal of the second RAT. The UE 120 may compare the frame structure of the second RAT to the frame structure of the first RAT to determine slots and/or symbols of the first RAT that overlap in the time domain with the active time of the signal of the second RAT. For example, the UE 120 may determine one or more slots of the first RAT that overlap in the time domain with the one or more subframes of the second RAT associated with the active time of the signal of the second RAT, based at least in part on determining the frame timing offset between the frame structure of the first RAT and the frame structure of the second RAT, and the DRX cycle associated with the signal of the second RAT.

The UE 120 may determine one or more SRS resources that overlap in the time domain with the active time of the signal of the second RAT based at least in part on the configured periodicity and/or slot offset associated with the one or more SRS resources. The UE 120 may determine a periodicity and a slot offset of a configured SRS resource to determine in which slots and/or which symbols within those slots the SRS resource is configured to be transmitted. For example, an SRS resource may be configured to be transmitted every 80 slots (e.g., the periodicity) and in the $63^{rd}$ slot from when the configuration is received (e.g., the slot offset). Additionally, the SRS resource may be configured to be transmitted starting in a first symbol of a slot (e.g., a starting symbol) and for 2 slots (e.g., a duration). As a result, the UE 120 may determine that every 80 slots, starting at the $63^{rd}$ slot from when the configuration is received, the SRS resource is configured to be transmitted in the first 2 symbols of a slot. The UE 120 may determine a timing of other SRS resources configured in the SRS resource configuration in a similar manner.

The UE 120 may determine a time domain overlap between one or more SRS resources and the active time of the signal of the second RAT based at least in part on comparing slots and/or symbols of the first RAT that overlap in the time domain with the active time of the signal of the second RAT to the slots and/or symbols in which the one or more SRS resources are configured to be transmitted. In some aspects, as the SRS resources are configured to be transmitted periodically and the DRX cycle of the second RAT repeats periodically, an SRS resource may continually overlap in the time domain with the active time of the signal of the second RAT.

In some aspects, the UE 120 may determine the SRS resources which overlap most often in the time domain with the active time of the signal of the second RAT. For example, the UE 120 may determine one or more SRS resources that have the highest quantity of occurrences of a time domain overlap with the active time of the signal of the second RAT.

The UE 120 may determine one or more antenna elements (e.g., physical antennas, antenna ports, antenna modules, antenna switches, and/or the like) that have a hardware restriction due to receiving and/or decoding the signal of the second RAT. That is, the UE 120 may determine one or more antenna elements that are to be used to receive and/or decode the signal of the second RAT during the DRX cycle. A hardware restriction may include a restriction of the antenna elements to be used for other purposes (such as for transmitting an SRS and/or the like) during the active time of the signal of the second RAT (e.g., during the active time of the DRX cycle). For example, the UE 120 may use a receive antenna of the UE 120 to receive/monitor for the signal of the DRX cycle of the second RAT. The receive antenna may be associated with an antenna module that includes antenna elements or components used to receive and/or decode the signal. In some aspects, an antenna module may be associated with a plurality of antennas of the UE 120. As a result, in some aspects, all antennas associated with an antenna module that is to be used to receive and/or decode the signal of the second RAT may be associated with a hardware restriction, as described above. In some aspects, only an antenna (e.g., and not other antennas associated with an antenna module of the antenna) that is to be used to receive and/or decode the signal of the second RAT may be associated with a hardware restriction.

As shown by reference number 720, the UE 120 may modify the SRS configuration to mitigate the one or more collisions between one or more SRS resources to be used for SRS antenna switching and the active time of the signal of the second RAT. The UE 120 may modify one or more antenna elements associated with SRS resources to be used for SRS antenna switching to mitigate the one or more collisions. For example, the UE 120 may determine one or more SRS resources that overlap in the time domain with the active time of the signal of the second RAT, as described above. The UE 120 may map the one or more SRS resources to antenna elements of the UE 120 that are not to be used to receive and/or decode the signal of the second RAT. The UE 120 may map one or more SRS resources that do not overlap in the time domain with the active time of the signal of the second RAT (e.g., one or more SRS resources that are configured to be transmitted during an inactive time of the DRX cycle of the second RAT) to one or more antenna elements that are to be used to receive and/or decode the signal of the second RAT. As the UE 120 is configured to transmit these one or more SRS resources during an inactive time of the DRX cycle of the second RAT, there may be no hardware restriction associated with the one or more antenna elements during the time that the one or more SRS resources are configured to be transmitted.

For example, a UE 120 may be associated with 6 antennas (antenna 1, antenna 2, antenna 3, antenna 4, antenna 5, and antenna 6) and 2 antenna modules (antenna module 1 (associated with antenna 1, antenna 2, and antenna 3) and antenna module 2 (associated with antenna 4, antenna 5, and antenna 6)). The UE 120 SRS antenna switching capability may be 1T4R, indicating that the UE 120 includes 1 Tx chain and 4 Rx antennas (e.g., indicating that the UE 120 may perform SRS antenna switching between the 4 Rx antennas). For example, when performing the SRS antenna switching procedure, the UE 120 may transmit an SRS resource on antenna 2, antenna 3, antenna 5, and antenna 6 according to the SRS resource configuration. The UE 120 may be using antenna 4 (e.g., and antenna module 2) to monitor for, receive, and/or decode the signal of the DRX cycle of the second RAT. If an SRS resource is mapped to antenna 5 and/or antenna 6 and is configured to be transmitted during an active time of the signal of the second RAT, the UE 120 may drop (e.g., not transmit) the SRS resource due to the hardware restriction associated with antenna module 2, as described above). For example, the SRS resource configuration may sequentially map SRS resources to antennas (e.g., a first SRS resource to antenna 2, a second SRS resource to antenna 3, a third SRS resource to antenna 5, and a fourth SRS resource to antenna 6). If the third SRS resource and/or the fourth SRS resource are configured to be transmitted at a same time as the active time of the signal of the second RAT, the third SRS resource and/or the fourth SRS resource may be dropped by the UE 120, resulting in the first cell determining that the downlink channel associated with antenna 5 and/or antenna 6 is poor (e.g., based at least in part on the SRS antenna switching procedure and the uplink and downlink channel reciprocity).

Therefore, the UE 120 may map the third SRS resource and/or the fourth SRS resource to an antenna associated with antenna module 1. For example, if the UE 120 determines that the third SRS resource is configured to be transmitted at a same time as the active time of the signal of the second RAT, the UE 120 may map the third SRS resource to antenna 2 or antenna 3. The UE 120 may map the remaining SRS resources to the remaining Rx antennas if the remaining SRS resources do not have time domain overlaps with the active time of the signal of the second RAT. In some aspects, the UE 120 may modify the antenna mapping of the SRS resource that has the highest quantity of time domain overlaps with the active time of the signal of the second RAT. In some aspects, the UE 120 may modify the antenna mapping of any SRS resource that has time domain overlaps with the active time of the signal of the second RAT.

As a result, the UE 120 may modify the SRS configuration such that the UE 120 may transmit an SRS resource using one or more antenna elements at the same time as the UE 120 is monitoring for, receiving, and/or decoding the signal of the second RAT while not impacting the receiving and/or decoding the signal of the second RAT (e.g., that is using one or more different antenna elements of the UE 120). Therefore, using the example described above, the UE 120 may perform the SRS antenna switching procedure using antenna 2, antenna 3, antenna 5, and antenna 6, while also receiving and/or decoding the signal of the second RAT using antenna 4.

In some aspects, the UE 120 may modify an SRS antenna switching capability of the UE 120 to mitigate the one or more collisions. For example, if the original SRS antenna switching capability of the UE 120 is 1T4R, the UE 120 may downgrade the SRS antenna switching capability of the UE 120 to 1T2R (e.g., indicating that only 2 Rx antennas may be used for the SRS antenna switching procedure). Therefore, the UE 120 may voluntarily drop the SRS resources that collide with the active time of the signal of the second RAT, rather than dropping the SRS resources due to the hardware restriction and the time domain overlap, as described above. For example, the UE 120 may perform an RRC connection release with the first cell, downgrade the SRS antenna switching capability of the UE 120, and signal to the first cell the downgraded SRS antenna switching capability of the UE 120. This may indicate to the first cell that the UE 120 is not capable of using the one or more antenna elements associated with receiving and/or decoding the signal of the second RAT, rather than the first cell associating the channels associated with those one or more antenna elements with poor channel conditions.

In some aspects, the UE 120 may modify the DRX cycle configuration associated with the UE 120 through network assistance to mitigate the one or more collisions. For example, the UE 120 may indicate to the base station 110 associated with the second cell that the DRX cycle configuration is to be modified. The base station 110 associated with the second cell may modify the DRX cycle configuration (e.g., a periodicity associated with the DRX cycle, an on duration associated with the DRX cycle, and/or an inactive time associated with the DRX cycle) to mitigate the one or more collisions. The base station 110 associated with the second cell may configure the UE 120 with the modified DRX cycle configuration. In some aspects, if the DRX cycle configuration associated with the UE 120 is modified, then the SRS configuration associated with the UE 120 may not be modified (e.g., the SRS configuration and/or the DRX cycle configuration may be modified to mitigate the one or more collisions).

As shown by reference number 725, the UE 120 may transmit the SRS resources for the SRS antenna switching procedure using all antenna ports of the UE 120 that are associated with the SRS antenna switching procedure according to the modified SRS configuration. As a result, the UE 120 may perform the SRS antenna switching procedure using all antenna elements of the UE 120 associated with the SRS antenna switching procedure based at least in part on modifying the configuration of the SRS antenna switching procedure. The modified configuration may mitigate or eliminate collisions between the SRS resources of the SRS antenna switching procedure and the active time of the signal of the second RAT. Therefore, the UE 120 may perform the SRS antenna switching procedure without dropping or not transmitting one or more SRS resources due to a hardware restriction, as described above. This may enable the first cell to accurately determine channel conditions associated with all Rx antennas of the UE 120.

As shown by reference number 730, the UE 120 may monitor for downlink communication from cell 2 according to the DRX configuration. For example, during an active time of the DRX configuration, the UE 120 may monitor for, receive, and/or decode a signal from cell 2 using one or more antenna elements of the UE 120. As the configuration for the SRS antenna switching procedure may have been modified to mitigate collisions with the active time of the signal of the second RAT, as described above, the monitoring, reception, and/or decoding of the signal of the second RAT may not be impacted by the performance of the SRS antenna switching procedure.

As a result, the UE 120 may perform the SRS antenna switching procedure using all antenna elements associated with the SRS antenna switching procedure (e.g., without dropping an SRS transmission) while also not impacting the reception/decoding of the signal of the second RAT. This conserves resources that would have otherwise been used dropping an SRS resource that collides with the signal of the second RAT. Moreover, this improves performance of communications between the UE 120 and the first cell, as the first cell may be enabled to accurately determine channel conditions for each antenna port of the UE 120 (e.g., as the UE does not need to drop one or more SRSs due to the collision with the signal of the second RAT).

As indicated above, FIG. 7 is provided as an example. Other examples may differ from what is described with respect to FIG. 7.

Figure 8:
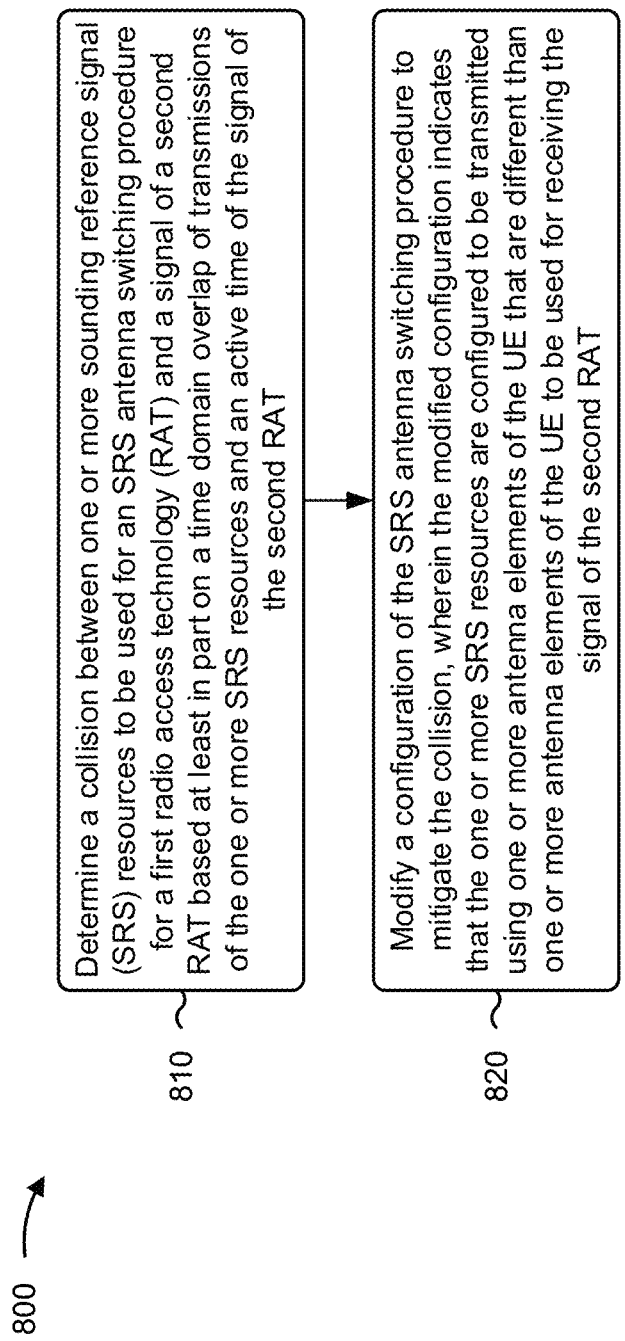
FIG. 8 is a diagram illustrating an example process associated with SRS antenna switching in a dual connectivity mode, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with SRS antenna switching in a dual connectivity mode.

As shown in FIG. 8, in some aspects, process 800 may include determining a collision between one or more SRS resources to be used for an SRS antenna switching procedure for a first RAT and a signal of a second RAT based at least in part on a time domain overlap of transmissions of the one or more SRS resources and an active time of the signal of the second RAT (block 810). For example, the UE (e.g., using receive processor 258, transmit processor 264, controller/processor 280, memory 282, and/or the like) may determine a collision between one or more SRS resources to be used for an SRS antenna switching procedure for a first RAT and a signal of a second RAT based at least in part on a time domain overlap of transmissions of the one or more SRS resources and an active time of the signal of the second RAT, as described above.

As further shown in FIG. 8, in some aspects, process 800 may include modifying a configuration of the SRS antenna switching procedure to mitigate the collision, wherein the modified configuration indicates that the one or more SRS resources are configured to be transmitted using one or more antenna elements of the UE that are different than one or more antenna elements of the UE to be used for receiving the signal of the second RAT (block 820). For example, the UE (e.g., using receive processor 258, transmit processor 264, controller/processor 280, memory 282, and/or the like) may modify a configuration of the SRS antenna switching procedure to mitigate the collision, as described above. In some aspects, the modified configuration indicates that the one or more SRS resources are configured to be transmitted using one or more antenna elements of the UE that are different than one or more antenna elements of the UE to be used for receiving the signal of the second RAT.

Process 800 may include additional aspects, such as any single aspect or any combination of aspects described below and/or in connection with one or more other processes described elsewhere herein.

In a first aspect, the UE is in a multi-SIM mode and the first RAT is associated with a first SIM of the UE and the second RAT is associated with a second SIM of the UE.

In a second aspect, alone or in combination with the first aspect, the first RAT is a New Radio RAT and the second RAT is a Long-Term Evolution RAT.

In a third aspect, alone or in combination with one or more of the first and second aspects, the signal of the second RAT is associated with a discontinuous reception cycle for the second RAT.

In a fourth aspect, alone or in combination with one or more of the first through third aspects, the one or more antenna elements of the UE include at least one of an antenna port of the UE, or an antenna module of the UE.

In a fifth aspect, alone or in combination with one or more of the first through fourth aspects, determining the collision between the one or more SRS resources and the signal of the second RAT includes determining a frame structure associated with the first RAT; determining a frame structure associated with the second RAT; and determining a frame timing offset between the frame structure of the first RAT and the frame structure of the second RAT.

In a sixth aspect, alone or in combination with one or more of the first through fifth aspects, determining the collision between the one or more SRS resources and the signal of the second RAT further includes determining a cycle associated with the signal of the second RAT, where the cycle indicates one or more subframes of the second RAT associated with the active time of the signal of the second RAT, and determining one or more slots of the first RAT that overlap in the time domain with the one or more subframes of the second RAT associated with the active time of the signal of the second RAT based at least in part on determining the frame timing offset between the frame structure of the first RAT and the frame structure of the second RAT, and the cycle associated with the signal of the second RAT.

In a seventh aspect, alone or in combination with one or more of the first through sixth aspects, determining the collision between the one or more SRS resources and the signal of the second RAT further includes determining, for an SRS resource of the one or more SRS resources, a periodicity of the SRS resource and a slot offset of the SRS resource; determining, for the SRS resource of the one or more SRS resources, a starting symbol and a duration associated with the SRS resource, and determining that the SRS resource is to be transmitted in the one or more slots of the first RAT that overlap in the time domain with the one or more subframes of the second RAT associated with the active time of the signal of the second RAT and during one or more symbols that overlap in the time domain with the active time of the signal of the second RAT based at least in part on determining the periodicity of the SRS resource and the slot offset of the SRS resource and the starting symbol and the duration associated with the SRS resource.

In an eighth aspect, alone or in combination with one or more of the first through seventh aspects, modifying the configuration of the SRS antenna switching procedure includes determining the one or more antenna elements of the UE to be used for receiving the signal of the second RAT, and configuring the SRS resource to be transmitted using the one or more antenna elements of the UE that are different than the one or more antenna elements of the UE to be used for receiving the signal of the second RAT.

In a ninth aspect, alone or in combination with one or more of the first through eighth aspects, modifying the configuration of the SRS antenna switching procedure includes determining one or more other SRS resources to be used for the SRS antenna switching procedure that do not overlap in the time domain with the active time of the signal of the second RAT; configuring at least one of the one or more other SRS resources to be transmitted using the one or more antenna elements of the UE to be used for receiving the signal of the second RAT, and configuring the one or more SRS resources to be transmitted using the one or more antenna elements of the UE that are different than the one or more antenna elements of the UE to be used for receiving the signal of the second RAT.

In a tenth aspect, alone or in combination with one or more of the first through ninth aspects, modifying the configuration of the SRS antenna switching procedure includes transmitting, to a base station associated with the first RAT, a downgraded SRS antenna switching capability of the UE, where the downgraded SRS antenna switching capability indicates a reduced quantity of antenna elements available for the SRS antenna switching procedure such that the one or more antenna elements associated with receiving the signal of the second RAT are not associated with the SRS antenna switching procedure.

In an eleventh aspect, alone or in combination with one or more of the first through tenth aspects, process 800 includes performing the SRS antenna switching procedure using all antenna elements of the UE associated with the SRS antenna switching procedure based at least in part on modifying the configuration of the SRS antenna switching procedure.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving a sounding reference signal (SRS) configuration associated with an SRS antenna switching procedure for a first radio access technology (RAT);

determining a collision between one or more SRS resources to be used for the SRS antenna switching procedure and a signal of a second RAT based at least in part on a time domain overlap of transmissions of the one or more SRS resources and an active time of the signal of the second RAT; and modifying a configuration of the SRS antenna switching procedure to mitigate the collision, wherein the modified configuration indicates that the one or more SRS resources are configured to be transmitted using one or more antenna elements of the UE that are different than one or more antenna elements of the UE to be used for receiving the signal of the second RAT.

2. The method of claim 1, wherein the UE is in a multiple subscriber identity module (multi-SIM) mode and the first RAT is associated with a first subscriber identity module (SIM) of the UE and the second RAT is associated with a second SIM of the UE.

3. The method of claim 1, wherein the first RAT is a New Radio RAT and the second RAT is a Long-Term Evolution RAT.

4. The method of claim 1, wherein the signal of the second RAT is associated with a discontinuous reception cycle for the second RAT.

5. The method of claim 1, wherein the one or more antenna elements of the UE include at least one of:
an antenna port of the UE, or
an antenna module of the UE.

6. The method of claim 1, wherein determining the collision between the one or more SRS resources and the signal of the second RAT comprises:
determining a frame structure associated with the first RAT;
determining a frame structure associated with the second RAT; and
determining a frame timing offset between the frame structure of the first RAT and the frame structure of the second RAT.

7. The method of claim 6, wherein determining the collision between the one or more SRS resources and the signal of the second RAT further comprises:
determining a cycle associated with the signal of the second RAT, wherein the cycle indicates one or more subframes of the second RAT associated with the active time of the signal of the second RAT; and
determining one or more slots of the first RAT that overlap in the time domain with the one or more subframes of the second RAT associated with the active time of the signal of the second RAT based at least in part on determining the frame timing offset between the frame structure of the first RAT and the frame structure of the second RAT, and the cycle associated with the signal of the second RAT.

8. The method of claim 7, wherein determining the collision between the one or more SRS resources and the signal of the second RAT further comprises:
determining, for an SRS resource of the one or more SRS resources, a periodicity of the SRS resource and a slot offset of the SRS resource;
determining, for the SRS resource of the one or more SRS resources, a starting symbol and a duration associated with the SRS resource; and
determining that the SRS resource is to be transmitted in the one or more slots of the first RAT that overlap in the time domain with the one or more subframes of the second RAT associated with the active time of the signal of the second RAT and during one or more symbols that overlap in the time domain with the active time of the signal of the second RAT based at least in part on determining the periodicity of the SRS resource and the slot offset of the SRS resource and the starting symbol and the duration associated with the SRS resource.

9. The method of claim 8, wherein modifying the configuration of the SRS antenna switching procedure comprises:
determining the one or more antenna elements of the UE to be used for receiving the signal of the second RAT; and
configuring the SRS resource to be transmitted using the one or more antenna elements of the UE that are different than the one or more antenna elements of the UE to be used for receiving the signal of the second RAT.

10. The method of claim 1, wherein modifying the configuration of the SRS antenna switching procedure comprises:
determining one or more other SRS resources to be used for the SRS antenna switching procedure that do not overlap in the time domain with the active time of the signal of the second RAT;
configuring at least one of the one or more other SRS resources to be transmitted using the one or more antenna elements of the UE to be used for receiving the signal of the second RAT; and
configuring the one or more SRS resources to be transmitted using the one or more antenna elements of the UE that are different than the one or more antenna elements of the UE to be used for receiving the signal of the second RAT.

11. The method of claim 1, wherein modifying the configuration of the SRS antenna switching procedure comprises:
transmitting, to a network node associated with the first RAT, a downgraded SRS antenna switching capability of the UE, wherein the downgraded SRS antenna switching capability indicates a reduced quantity of antenna elements available for the SRS antenna switching procedure such that the one or more antenna elements associated with receiving the signal of the second RAT are not associated with the SRS antenna switching procedure.

12. The method of claim 1, further comprising:
performing the SRS antenna switching procedure using all antenna elements of the UE associated with the SRS antenna switching procedure based at least in part on modifying the configuration of the SRS antenna switching procedure.

13. A user equipment (UE) for wireless communication, comprising:
a memory; and
one or more processors coupled to the memory, the one or more processors configured to:
receive sounding reference signal (SRS) configuration associated with an SRS antenna switching procedure for a first radio access technology (RAT);
determine a collision between one or more SRS resources to be used for the SRS antenna switching procedure and a signal of a second RAT based at least in part on a time domain overlap of transmissions of the one or more SRS resources and an active time of the signal of the second RAT; and
modify a configuration of the SRS antenna switching procedure to mitigate the collision, wherein the modified configuration indicates that the one or more SRS resources are configured to be transmitted using one or more antenna elements of the UE that are different than one or more antenna elements of the UE to be used for receiving the signal of the second RAT.

14. The UE of claim 13, wherein the UE is in a multiple subscriber identity module (multi-SIM) mode and the first RAT is associated with a first subscriber identity module (SIM) of the UE and the second RAT is associated with a second SIM of the UE.

15. The UE of claim 13, wherein the first RAT is in a connected mode and the second RAT is in an idle mode.

16. The UE of claim 13, wherein the one or more processors, to determine the collision between the one or more SRS resources and the signal of the second RAT, are configured to:
determine a frame structure associated with the first RAT;
determine a frame structure associated with the second RAT; and
determine a frame timing offset between the frame structure of the first RAT and the frame structure of the second RAT.

17. The UE of claim 16, wherein the one or more processor, to determine the collision between the one or more SRS resources and the signal of the second RAT, are configured to:
determine a cycle associated with the signal of the second RAT, wherein the cycle indicates one or more subframes of the second RAT associated with the active time of the signal of the second RAT; and
determine one or more slots of the first RAT that overlap in the time domain with the one or more subframes of the second RAT associated with the active time of the signal of the second RAT based at least in part on determining the frame timing offset between the frame structure of the first RAT and the frame structure of the second RAT, and the cycle associated with the signal of the second RAT.

18. The UE of claim 17, wherein the one or more processors, to determine the collision between the one or more SRS resources and the signal of the second RAT, are configured to:
determine, for an SRS resource of the one or more SRS resources, a periodicity of the SRS resource and a slot offset of the SRS resource;
determine, for the SRS resource of the one or more SRS resources, a starting symbol and a duration associated with the SRS resource; and
determine that the SRS resource is to be transmitted in the one or more slots of the first RAT that overlap in the time domain with the one or more subframes of the second RAT associated with the active time of the signal of the second RAT and during one or more symbols that overlap in the time domain with the active time of the signal of the second RAT based at least in part on determining the periodicity of the SRS resource and the slot offset of the SRS resource and the starting symbol and the duration associated with the SRS resource.

19. The UE of claim 18, wherein the one or more processors, to modify the configuration of the SRS antenna switching procedure, are configured to:
determine the one or more antenna elements of the UE to be used for receiving the signal of the second RAT; and
configure the SRS resource to be transmitted using the one or more antenna elements of the UE that are different than the one or more antenna elements of the UE to be used for receiving the signal of the second RAT.

20. The UE of claim 13, wherein the one or more processors, to modify the configuration of the SRS antenna switching procedure, are configured to:

determine one or more other SRS resources to be used for the antenna switching procedure that do not overlap in the time domain with the active time of the signal of the second RAT;
configure at least one of the one or more other SRS resources to be transmitted using the one or more antenna elements of the UE to be used for receiving the signal of the second RAT; and
configure the one or more SRS resources to be transmitted using the one or more antenna elements of the UE that are different than the one or more antenna elements of the UE to be used for receiving the signal of the second RAT.

21. The UE of claim 13, wherein the one or more processors are further configured to:
perform the SRS antenna switching procedure using all antenna elements of the UE associated with the SRS antenna switching procedure based at least in part on modifying the configuration of the SRS antenna switching procedure.

22. A non-transitory computer-readable medium storing one or more instructions for wireless communication, the one or more instructions comprising:
one or more instructions that, when executed by one or more processors of a user equipment (UE), cause the one or more processors to:
receive a sounding reference signal (SRS) configuration associated with an SRS antenna switching procedure for a first radio access technology (RAT);
determine a collision between one or more sounding reference signal (SRS) resources to be used for the SRS antenna switching procedure and a signal of a second RAT based at least in part on a time domain overlap of transmissions of the one or more SRS resources and an active time of the signal of the second RAT; and
modify a configuration of the SRS antenna switching procedure to mitigate the collision, wherein the modified configuration indicates that the one or more SRS resources are configured to be transmitted using one or more antenna elements of the UE that are different than one or more antenna elements of the UE to be used for receiving the signal of the second RAT.

23. The non-transitory computer-readable medium of claim 22, wherein the UE is in a multiple subscriber identity module (multi-SIM) mode and the first RAT is associated with a first subscriber identity module (SIM) of the UE and the second RAT is associated with a second SIM of the UE.

24. The non-transitory computer-readable medium of claim 22, wherein the one or more instructions that, when executed by one or more processors, cause the one or more processors to modify the configuration of the SRS antenna switching procedure, further cause the one or more processors to:
determine one or more other SRS resources to be used for the SRS antenna switching procedure that do not overlap in the time domain with the active time of the signal of the second RAT;
configure at least one of the one or more other SRS resources to be transmitted using the one or more antenna elements of the UE to be used for receiving the signal of the second RAT; and
configure the one or more SRS resources to be transmitted using one or more antenna elements of the UE that are different than the one or more antenna elements of the UE to be used for receiving the signal of the second RAT.

25. The non-transitory computer-readable medium of claim 22, wherein the one or more instructions, when executed by the one or more processors, further cause the one or more processors to:
perform the SRS antenna switching procedure using all antenna elements of the UE associated with the SRS antenna switching procedure based at least in part on modifying the configuration of the SRS antenna switching procedure.

26. An apparatus for wireless communication, comprising:
means for receiving a sounding reference signal (SRS) configuration associated with an SRS antenna switching procedure for a first radio access technology (RAT);
means for determining a collision between one or more SRS resources to be used for the SRS antenna switching procedure and a signal of a second RAT based at least in part on a time domain overlap of transmissions of the one or more SRS resources and an active time of the signal of the second RAT; and
means for modifying a configuration of the SRS antenna switching procedure to mitigate the collision, wherein the modified configuration indicates that the one or more SRS resources are configured to be transmitted using one or more antenna elements of the apparatus that are different than one or more antenna elements of the apparatus to be used for receiving the signal of the second RAT.

27. The apparatus of claim 26, wherein the means for determining the collision between the one or more SRS resources and the signal of the second RAT comprises:
means for determining a frame structure associated with the first RAT;
means for determining a frame structure associated with the second RAT; and
means for determining a frame timing offset between the frame structure of the first RAT and the frame structure of the second RAT.

28. The apparatus of claim 27, wherein the means for determining the collision between the one or more SRS resources and the signal of the second RAT further comprises:

means for determining a cycle associated with the signal of the second RAT, wherein the cycle indicates one or more subframes of the second RAT associated with the active time of the signal of the second RAT; and
means for determining one or more slots of the first RAT that overlap in the time domain with the one or more subframes of the second RAT associated with the active time of the signal of the second RAT based at least in part on determining the frame timing offset between the frame structure of the first RAT and the frame structure of the second RAT, and the cycle associated with the signal of the second RAT.

29. The apparatus of claim 28, wherein the means for determining the collision between the one or more SRS resources and the signal of the second RAT further comprises:
means for determining, for an SRS resource of the one or more SRS resources, a periodicity of the SRS resource and a slot offset of the SRS resource;
means for determining, for the SRS resource of the one or more SRS resources, a starting symbol and a duration associated with the SRS resource; and
means for determining that the SRS resource is to be transmitted in the one or more slots of the first RAT that overlap in the time domain with the one or more subframes of the second RAT associated with the active time of the signal of the second RAT and during one or more symbols that overlap in the time domain with the active time of the signal of the second RAT based at least in part on determining the periodicity of the SRS resource and the slot offset of the SRS resource and the starting symbol and the duration associated with the SRS resource.

30. The apparatus of claim 29, wherein the means for modifying the configuration of the SRS antenna switching procedure comprises:
means for determining the one or more antenna elements of the apparatus to be used for receiving the signal of the second RAT; and
means for configuring the SRS resource to be transmitted using the one or more antenna elements of the apparatus that are different than the one or more antenna elements of the apparatus to be used for receiving the signal of the second RAT.

* * * * *